Nov. 28, 1967 ASAHIKO GOTO 3,354,913
HIGH ANTICORROSION METAL LINING STRUCTURE

Filed Aug. 9, 1963 2 Sheets-Sheet 2

INVENTOR.
ASAHIKO GOTO.
BY
ATTORNEY.

United States Patent Office 3,354,913
Patented Nov. 28, 1967

3,354,913
HIGH ANTICORROSION METAL LINING STRUCTURE
Asahiko Goto, Nada-ku, Kobe, Japan, assignor to Kobe Steel Works, Ltd., Fukiai-ku, Kobe, Japan
Filed Aug. 9, 1963, Ser. No. 301,111
Claims priority, application Japan, Aug. 15, 1962, 37/35,426/62
10 Claims. (138—147)

This invention relates to a structure for lining super-anticorrosion metals (titanium, zirconium, tantalum or base alloys of these), the welding of which with different kinds of metals is impracticable, easily, accurately and firmly to various types of appliances (reaction vessel, reaction tower, chemical treatment vessel, valve, etc.) or pipings. The characteristic feature of this invention lies in the point of lining a casing with a lining material through a connecting sleeve by means of cutting a hole in the wall of a casing to which lining is to be applied so as to pass through to the inside, fitting a connecting sleeve made of metal of the same kind as the lining material into said hole so as not to pass through to the interior of the casing or fixing said connecting sleeve mechanically to the wall of the casing through a headed member, and, while contacting the end surface of said connecting sleeve with the outside of the lining material, welding the two along the inner peripheral edge of the connecting sleeve.

Figure 1:
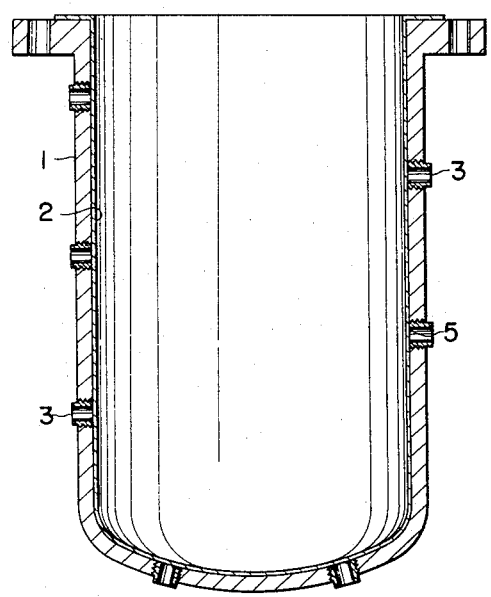

Herein below is given an explanation as to the embodiments of this invention by referring to the accompanying drawings, in which FIG. 1 is a longitudinal cross-sectional view of a pressure vessel with lining applied by the practice of this invention; and FIG. 2 to FIG. 10 are enlarged cross-sectional views showing various embodiments of a lining structure.

Figure 2:
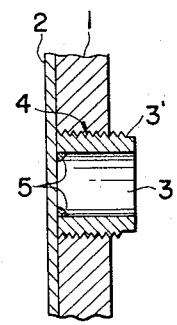
Figure 3:
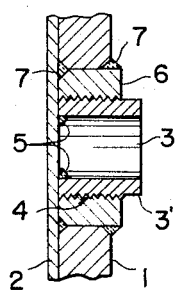

Referring to FIG. 1 to FIG. 5, in lining the inside of a casing 1 made of material such as soft steel, stainless steel, etc. with a super-anticorrosive lining plate 2 consisting of titanium, zirconium, tantalum or a base alloy of these, a connecting sleeve 3 with a male screw 4 carved on the outer periphery is prepared with an anticorrosion metal of the same kind as said lining plate and fixedly screw-engaged with a screw hole of the casing 1 cut in a position necessary for connecting said lining plate 2 so as to contact the inner end surface thereof closely with the surface of the lining plate 2, and a padding weld fillet weld) 5 of the same kind of metal is applied to the inner peripheral edge of the inner end of the connecting sleeve 3 as well as to the lining plate 2 (FIG. 2). In order for said connecting sleeve 3 to be screwed in, a square head 3' may be formed at the outer end thereof, but, in some cases, the inner side thereof may be made into a square hole. Also, in case the screw hole is cut in the casing 1, if there is a fear of the casing being weakened at that place, then, as shown in FIG. 3, a reinforcing boss 6 (made of metal of the same kind as the casing 1) having a screw hole may be inserted in the hole of the casing 1 and welded 7, and thereafter the connecting sleeve 3 may be screwed in the screw hole of said reinforcing boss.

The structure in the above embodiment is suitable in cases where the internal pressure at the time of use is low enough to sometimes become negative pressure.

In the above embodiment, the lining plate 2, being exposed to the inside of the connecting sleeve 3, is single, and, therefore, when the internal pressure used is high, the structure is made into one stated below.

Figure 4:
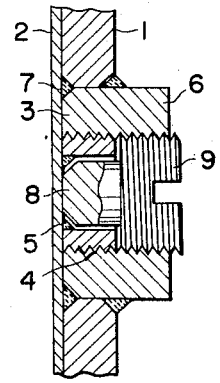

That is to say, as shown in FIG. 4, the length of the connecting sleeve 3 is made shorter than that of the reinforcing boss 6, thereby leaving a margin in the screw hole of said reinforcing boss, and a reinforcing plug 9 made of an appropriate material having a projection 8 at the forward end is screwed in that part of the screw hole so as to plunge said projection into the connecting sleeve 3 and, at the same time, to compress the forward end of said projection against the surface of the lining plate 2. If this is followed, then, because the internal pressure used which acts upon the lining plate 2 is maintained by the reinforcing plug 9, the lining part inside the connecting sleeve 3 can be fully prevented from being damaged or destructed by the pressure.

Figure 5:
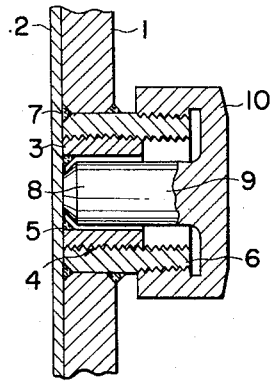

In cases where, for the same purpose, the reinforcing plug 9 is screwed in the reinforcing boss 6, a cap-nut-like cover 10 is provided at the outer end of the reinforcing plug 9 as shown in FIG. 5, the female screw provided on the inner periphery of said cover being screw-engaged with the male screw carved on the outer periphery of the outer end part of the boss 6 so as to contact the inner end of the reinforcing plug 9 with the outside of the lining plate 2, thereby making it possible to support the lining plate 2 so that it will not become deformed to expand into the screw hole of the connecting sleeve 3.

By the provision of a combined structure of the type mentioned above which is disposed at many places of the casing 1 as shown in FIG. 1, the whole lining plate 2 can be fixed firmly to the casing 1.

Figure 6:
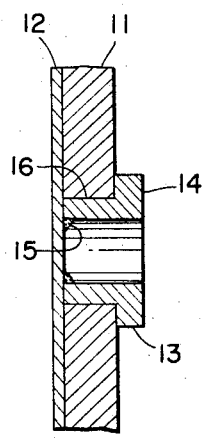
Figure 7:
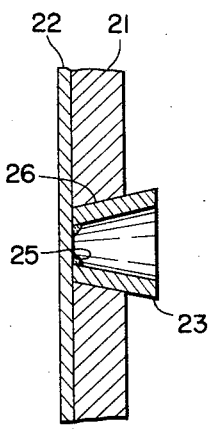

FIG. 6 shows another embodiment of this invention, wherein, in lining the inside of a casing 11 made of material such as soft steel, stainless steel, etc. with a super-anticorrosive lining plate 12 consisting of titanium, zirconium, tantalum or a base alloy of these, a connecting sleeve 13 having a flange 14 at the outer periphery of one end is prepared with an anticorrosion metal of the same kind as said lining plate and fixedly screw-engaged with a sleeve hole 16 of the casing 11 cut in a position necessary for connecting the lining plate 12 so as to contact the inner end surface thereof closely with the surface of the lining plate 12, and a padding weld (fillet weld 15) of the same kind of metal is applied to the inner peripheral edge of the inner end of the connecting sleeve 13 as well as to the lining plate 12 (FIG. 7). In case the sleeve hole 16 is cut in the casing 11, if there is a fear of the casing being weakened at that place, then, as in the embodiment mentioned above, a reinforcing boss may be inserted in the hole of the casing 11 and welded, and thereafter the connecting sleeve 13 may be inserted in the sleeve hole of said reinforcing boss.

By the provision of a combined structure of the type mentioned above which is disposed at many places of the casing 11 as shown in FIG. 6, the whole lining plate 12 can be fixed firmly to the casing 11.

Figure 8:
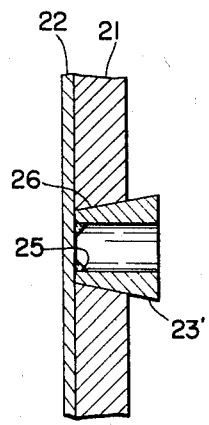

The embodiments illustrated in FIGS. 7 and 8 show other modifications of this invention, wherein, in lining the inside of a casing 21 made of material such as soft steel, stainless steel, etc. with a super-anticorrosive lining plate 22 consisting of titanium, zirconium, tantalum or a base alloy of these, a connecting sleeve 23 with the outer periphery tapered off is prepared with an anticorrosion metal of the same kind as said lining plate 22 and fixedly inserted in an inwardly tapered hole 26 cut in the casing 21 that is necessary for connecting said lining plate 22 so as to contact the inner end surface thereof closely with the surface of the lining plate 22, and a padding weld (fillet weld) 25 of the same kind of metal is applied to the inner peripheral edge of the inner end of the connecting sleeve 23 as well as to the lining plate 22 (FIG. 7).

In case the tapered hole 26 is cut in the casing 21, if, as in the embodiments mentioned above, there is a fear of the casing being weakened at that place, then a reinforcing boss may be inserted in the hole of the casing 21 and welded, and thereafter the connecting sleeve may be inserted in the tapered hole of said reinforcing boss. The connecting sleeve 23 must be tapered at the outside, but it may be made like the connecting sleeve 23′ shown in FIG. 10, and the inside thereof needs not always be tapered. (Refer to FIG. 9 and FIG. 10.)

By the provision of a combined structure of the type mentioned above which is disposed at many places of the casing 21 as illustrated in FIG. 1, the whole lining plate can be fixed firmly to the casing 21.

Figure 9:
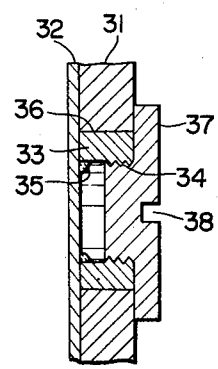
Figure 10:
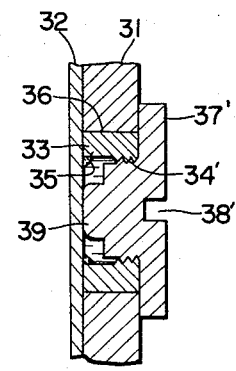

FIGS. 9 and 10 illustrate other embodiments of this invention, wherein, in lining the inside of a casing 31 made of material such as soft steel, stainless steel, etc. with a super-anticorrosive lining plate 32 consisting of titanium, zirconium, tantalum or a base alloy of these, a connecting sleeve 33 with a thread 34 carved on the inner periphery is prepared with an anticorrosion metal of the same kind as said lining plate and inserted in a sleeve hole 36 of the casing 31 cut in a position necessary for connecting the lining plate 32 so as to contact the inner end surface thereof closely with the surface of the lining plate 32, then a screw plug 38 having a head 37 is inserted in said connecting sleeve, and thereafter a padding weld (fillet weld) 35 is applied to the inner peripheral edge of the inner end of the connecting sleeve 33 (FIG. 12). In order for said screw plug 38 to be screwed in, a square head may be formed at the outer end thereof, but, in some cases, the inside thereof may be made into a square hole. Also, in case the sleeve hole 36 is cut in the casing 31, if there is a fear of the casing being weakened at that place, then, as in the embodiments mentioned above, a reinforcing boss may be inserted in the hole of the casing 31 and welded, and thereafter the connecting sleeve 33 may be inserted in the sleeve hole of said reinforcing boss.

The structure in the above embodiment is suitable in cases where the internal pressure at the time of use is low enough to sometimes become negative pressure.

In the above embodiment, the lining plate 32, being exposed to the inside of the connecting sleeve 33, is single, and therefore, when the internal pressure used is high, a projection 39 is provided at the forward end of a screw plug 38′ as shown in FIG. 10 so as to press-contact the forward end of said projection closely with the surface of the lining plate 32, thereby receiving the internal pressure used which acts upon the lining plate by said screw plug 38′ to prevent the lining part inside the connecting sleeve 33 from being damaged or destructed by the pressure.

By the provision of a combined structure of the type mentioned above which is disposed at many places of the casing 31 as illustrated in FIG. 1, the whole lining plate 32 can be fixed firmly to the casing 31. In this case, even when negative pressure arises in the casing 31, no deformation or distortion is caused locally to the lining plate 32, since the heads 37, 37′ of the screw plugs 38, 38′ screwed in the connecting sleeve 33 are held at the outside of the casing 31, and, therefore, the present structure is very effective as a lining structure of anticorrosion metal of the type mentioned in which Young's modulus is low.

When a metal, such as stainless steel, nickel, Monel or Hastelloy, which can be welded with a different sort of metal is used as a lining material, it is possible to weld and fix the same to the casing by applying strip lining, but, because high anticorrosion metals such as titanium, zirconium, etc. cannot be welded with the casing, a special lining-fixing structure is required. Especially, in cases where there is a fear of the pressure used becoming negative pressure, there is the fatal defect that the pressure acts directly upon the lining material, thereby causing deformation or distortion thereto.

In this invention, as mentioned above, both a lining plate of high anticorrosion metal and a connecting sleeve which is made of metal of the same kind as the lining material and which is firmly fitted to the casing so as not to pass therethrough are positively connected together without resorting to the connection by screw, etc., and, on the other hand, the connecting sleeve and the lining plate are metallurgically connected by welding at the outside of the lining plate, and therefore, the inner surface is all made into a lining of high anticorrosion metal, with the result that, unlike in the case of screw-fixing, there is no cause of corrosion to the casing due to the leakage of an etching liquid, nor does the welded part come out to the inner surface of the lining plate, so that there is no defect whatsoever of corrosion to the welded part, and, even when negative pressure arises, no deformation or distortion is caused locally to the lining plate since the connecting sleeve is connected with the casing so as not to pass therethrough. Therefore, the present structure is very effective as a lining structure of anticorrosion metal of the type in which Young's modulus is low. Especially, in this invention, the welding of a connecting sleeve with a lining plate is effected from the outer periphery of the lining plate by making use of the hollowness of the connecting sleeve used, so that welding operation is easy as compared with the case in which welding is effected from the inside of a lining plate, and, in some cases, it is possible to apply helium arc welding, making the lining operation highly efficient.

Also, a structure, in which the lining-plate fixing part is reinforced with a reinforcing boss and a reinforcing plug which is centrally positioned in the connecting sleeve, has the action and effect that there arises no defect such as causes distortion to the lining plate even for the fluid used which is of high pressure and which causes negative pressure.

What is claimed is:

1. A metal structure lined with a fluid tight, dissimilar metal liner which cannot be welded thereto, a plurality of sleeve-like plugs of a metal which can be welded to said dissimilar metal mechanically secured in plug holes in the metal structure and contacting the dissimilar metal liner, the plugs being weldingly attached to the metal liner by welds in the interior of the sleeve-like plugs, whereby the liner is securely mounted against the surface of the metal structure without using holes in the liner.

2. The metal structure of claim 1 wherein the plugs are mounted in reinforcing metal bosses attached to the metal structure.

3. A structure of a metal which cannot be welded to titanium, zirconium, tantalum, or base alloys of these metals, the metal structure being lined with a fluid tight anti-corrosive liner of titanium, zirconium, tantalum, or base alloys of these metals, a plurality of sleeve-like plugs of the respective metal of the liner mechanically secured in plug holes in the metal structure and contacting the dissimilar metal liner, the plugs being weldingly attached to the metal liner by welds in the interior of the sleeve-like plugs, whereby the liner is securely mounted against the surface of the metal structure without using holes in the liner.

4. A structure of a metal which cannot be welded to titanium, zirconium, tantalum, or base alloys of these metals, the metal structure being lined with a fluid tight anti-corrosive liner of titanium, zirconium, tantalum, or base alloys of these metals, a plurality of sleeve-like plugs of the respective metal of the liner threadingly attached in plug holes in the metal structure and contacting the dissimilar metal liner, the plugs being weldingly attached to the metal liner by welds in the interior of the sleeve-like plugs, whereby the liner is securely mounted against the surface of the metal structure without using holes in the liner.

5. The structure of claim 4 wherein the plugs are threadingly mounted in reinforcing metal bosses weldingly attached in said plug holes in the metal structure.

6. A structure of a metal which cannot be welded to titanium, zirconium, tantalum, or base alloys of these metals, the metal structure being lined with an anti-corrosive liner of titanium, zirconium, tantalum, or base alloys of these metals, a plurality of first sleeve-like plugs of the respective metal of the liner threadingly attached in plug holes in the metal structure and contacting the dissimilar metal liner, the first plugs being weldingly attached to the metal liner by welds in the interior of the first sleeve-like plugs, second plugs threadingly attached in the plug holes in the metal structure and having an end portion projecting through the first sleeve-like plug and bearing against the liner, whereby the liner is securely mounted against the surface of the metal structure without using holes in the liner, and the portion of the liner adjacent the plug holes in the metal structure is reinforced by said second plug.

7. The structure of claim 6 wherein the first plugs are threadingly mounted in reinforcing metal bosses weldingly attached in the plug holes of the metal structure.

8. The structure of claim 7 wherein the metal bosses extend outward from the liner beyond the outer edges of the first sleeve-like plugs, and the second plugs threadingly engage the inner surface of the metal bosses.

9. The structure of claim 7 wherein one end of the second plug constitutes a cap-like cover which threadingly engages the outer surface of the reinforcing boss.

10. A structure of a metal which cannot be welded to titanium, zirconium, tantalum, or base alloys of these metals, the metal structure being lined with a fluid tight anti-corrosive liner of titanium, zirconium, tantalum, or base alloys of these metals, a plurality of first sleeve-like plugs of the respective metal of the liner mounted in plug holes in the metal structure and contacting the dissimilar metal liner, the first plugs being weldingly attached to the metal liner by welds in the interior of the first sleeve-like plugs, second plugs threadingly attached to the interior of the first sleeve-like plugs, each having a head portion bearing against the surface of the metal structure opposite the liner.

References Cited
UNITED STATES PATENTS

| | | | |
|---|---|---|---|
| 329,217 | 10/1885 | Ritter et al. | 29—470.5 X |
| 1,407,202 | 2/1922 | Kubler. | |
| 2,108,409 | 2/1938 | Peron | 29—480 |
| 2,117,500 | 5/1938 | Rambush | 220—63 X |
| 2,127,269 | 8/1938 | Robinson | 220—63 |
| 2,687,230 | 8/1954 | McPherson | 220—63 |

SAMUEL ROTHBERG, *Primary Examiner.*

B. E. KILE, *Assistant Examiner.*